US008650778B2

(12) United States Patent
Okano et al.

(10) Patent No.: US 8,650,778 B2
(45) Date of Patent: Feb. 18, 2014

(54) HYDRAULIC DRIVE DEVICE FOR HYDRAULIC WORKING MACHINE

(75) Inventors: Yasuo Okano, Tsuchiura (JP); Tsuyoshi Nakamura, Tsuchiura (JP); Kouji Ishikawa, Tsuchiura (JP); Kensuke Sato, Tsuchiura (JP); Naoki Hagiwara, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 168 days.

(21) Appl. No.: 13/393,752

(22) PCT Filed: Sep. 1, 2010

(86) PCT No.: PCT/JP2010/064951

§ 371 (c)(1),
(2), (4) Date: Mar. 1, 2012

(87) PCT Pub. No.: WO2011/027791

PCT Pub. Date: Mar. 10, 2011

(65) Prior Publication Data

US 2012/0163949 A1 Jun. 28, 2012

(30) Foreign Application Priority Data

Sep. 2, 2009 (JP) ................................ 2009-202653

(51) Int. Cl.
*E02F 3/43* (2006.01)
*G05D 7/01* (2006.01)

(52) U.S. Cl.
USPC ...................... 37/348; 172/3; 60/421; 91/420

(58) Field of Classification Search
USPC ............. 37/348, 466, 468; 172/2-11; 60/421, 60/428, 429, 430, 468, 328; 91/420, 436, 91/447, 451, 461; 701/50
See application file for complete search history.

(56) References Cited

U.S. PATENT DOCUMENTS

| | | | | |
|---|---|---|---|---|
| 5,005,466 | A * | 4/1991 | Miyaoka | 91/420 |
| 5,115,835 | A * | 5/1992 | Ueno | 137/596.13 |
| 5,832,808 | A * | 11/1998 | Ishizaki et al. | 91/447 |
| 6,708,490 | B2 * | 3/2004 | Toji et al. | 60/421 |
| 6,922,923 | B2 * | 8/2005 | Kondou | 37/348 |
| 2004/0093769 | A1 | 5/2004 | Kondou | |

FOREIGN PATENT DOCUMENTS

| | | | |
|---|---|---|---|
| JP | 61-116102 | A | 6/1986 |
| JP | 2-136432 | A | 5/1990 |
| JP | 6-2344 | A | 1/1994 |
| JP | 2002-115274 | A | 4/2002 |
| JP | 2002-181004 | A | 6/2002 |
| JP | 2005-221026 | A | 8/2005 |
| JP | 2008-185099 | A | 8/2008 |

OTHER PUBLICATIONS

International Search Report dated Nov. 16, 2010 including English-language translation (Four (4) pages).

* cited by examiner

*Primary Examiner* — Robert Pezzuto
(74) *Attorney, Agent, or Firm* — Crowell & Moring LLP

(57) ABSTRACT

A hydraulic drive system realizes a jack-up operation without arrangement of a flow rate control valve and center bypass selector valve. The hydraulic drive system has first and second hydraulic pumps, first and second directional control valves for controlling boom cylinders, a third directional control valve for controlling the boom cylinders, and a third hydraulic pump for feeding pressure oil to the third directional control valve. A jack-up selector valve has a second select position where, when a pressure in bottom chambers of the boom cylinders is not higher than a predetermined pressure, feeding of pressure oil, which is delivered from the first hydraulic pump and second hydraulic pump, to rod chambers of the boom cylinders, is held permissible in association with switching of the second directional control valve and third directional control valve by a manipulation of a control device.

6 Claims, 2 Drawing Sheets

HYDRAULIC DRIVE DEVICE FOR HYDRAULIC WORKING MACHINE

TECHNICAL FIELD

This invention relates to a hydraulic drive system for a hydraulic working machine such as a hydraulic excavator. The hydraulic drive system is arranged in the hydraulic working machine, and is provided with a jack-up selector valve for allowing a working element such as a boom to produce strong pushing force.

BACKGROUND ART

As a conventional technology of this kind, there is one disclosed in Patent Document 1. This conventional technology is applied to a hydraulic working machine, for example, a hydraulic excavator, and includes a first hydraulic pump and second hydraulic pump for delivering pressure oil to drive a working element which is movable up and down, for example, a boom, and a double-acting hydraulic cylinder operable by pressure oil, which has been delivered from these first hydraulic pump and second hydraulic pump, to drive the boom, specifically a boom cylinder. Also included are a first directional control valve for the working machine to control a flow of pressure oil to be fed from the first hydraulic pump to a bottom chamber or rod chamber of the boom cylinder, specifically a first directional control valve for the boom, a second directional control valve for the working machine to control a flow of pressure oil to be fed from the second hydraulic pump to the bottom chamber or rod chamber of the boom cylinder, specifically a second directional control valve for the boom, a control device for switchingly controlling the first directional control valve for the boom and the second directional control valve for the boom, and a jack-up selector valve to be switched when a pressure in the bottom chamber of the boom cylinder has reached a predetermined pressure.

The conventional technology further includes a flow rate control valve and a center bypass selector valve both of which, when the pressure in the bottom chamber of the boom cylinder has become the predetermined pressure or lower, are actuated in association with switching of the jack-up selector valve. As a result, the flow rate control valve is switched to permit feeding of pressure oil from the first hydraulic pump to the first directional control valve for the boom, while the center bypass selector valve closes a center bypass passage on a downstream side of the first directional control valve for the boom.

According to this conventional technology, when the boom is operated in a lowering direction and the bottom pressure of the boom cylinder has become lower than a switching pressure for the jack-up selector valve, in other words, the predetermined pressure, the flow rate control valve is switched to permit feeding of pressure oil from the first hydraulic pump to the first directional control valve for the boom, and in addition, the jack-up selector valve is also switched to close the center bypass passage. Owing to the cooperation of these flow rate control valve and center bypass selector valve, the pressure oil delivered from the first hydraulic pump is fed to the rod chamber of the boom cylinder via the flow rate control valve and the first directional control valve for the boom, thereby making it possible to allow the boom to produce strong pushing force such as jack-up force for a body.

PRIOR ART DOCUMENT

Patent Document

Patent Document 1: JP-A-2005-221026

DISCLOSURE OF THE INVENTION

Problem to be Solved by the Invention

According to the above-mentioned conventional technology, the jack-up selector valve is switched to feed pressure oil to the rod chamber of the boom cylinder so that strong pushing force such as jack-up force can be produced. When generating such strong pushing force, it is necessary, in association with switching of the jack-up selector valve, to switch the flow rate control valve and center bypass selector valve in combination such that they are allowed to cooperate. In practice, however, it is difficult to assure, between a switching time of the flow rate control valve and that of the center bypass selector valve, such a timing interval that enables a smooth transition to a jack-up operation. As a consequence, the flow rate control valve and center bypass selector valve may be switched at the same time. In such an instance, a sudden jack-up takes place to result in the occurrence of a shock on the hydraulic excavator, that is, the hydraulic working machine. On the other hand, the center bypass selector valve may also be switched with a slight delay in time after the flow rate control valve has been switched. In such an instance, a response delay arises in the jack-up operation, thereby tending to give an odd feel to the operator who is performing the jack-up operation.

Because the conventional technology needs to switch the flow rate control valve and center bypass selector valve in association with switching of the jack-up selector valve upon performing a jack-up operation, there is a potential problem that the control performance of the jack-up operation may be deteriorated if it is failed to provide, between the switching time of the flow rate control valve and that of the center bypass selector valve, such a timing interval that enables a smooth transition to the jack-up operation.

With the above-mentioned actual situation of the conventional technology in view, the present invention has as an object thereof the provision of a hydraulic drive system for a hydraulic working machine, which can realize a jack-up operation without arrangement of a flow rate control valve, which would otherwise be needed to enable feeding of pressure oil to directional control valves for a working element, and a center bypass selector valve.

Means for Solving the Problem

To achieve this object, a hydraulic drive system according to the present invention for a hydraulic working machine is characterized in that in a hydraulic drive system for a hydraulic working machine, said hydraulic drive system being provided with a first hydraulic pump and second hydraulic pump for delivering pressure oil to drive a working element which is movable up and down, a double-acting hydraulic cylinder operable by pressure oil, which has been delivered from the first hydraulic pump and second hydraulic pump, to drive the working element, a first directional control valve for the working element, said first directional control valve being for controlling a flow of pressure oil to be fed from the first hydraulic pump to a bottom chamber or rod chamber of the hydraulic cylinder, a second directional control valve for the working element, said second directional control valve being for controlling a flow of pressure oil to be fed from the second hydraulic pump to the bottom chamber or rod chamber of the hydraulic cylinder, a control device for switchingly controlling the first directional control valve for the working element and the second directional control valve for the working element, and a jack-up selector valve to be switched when a pressure in the bottom chamber of the hydraulic cylinder has reached a predetermined pressure, the hydraulic drive system is further provided with a third directional control valve for the working element to control a flow of pressure oil to be fed to the bottom chamber or rod chamber of the hydraulic cylinder, said third directional control valve for the working element being switchable by a manipulation of the control device, and also with a third hydraulic pump for feeding pressure oil to the third directional control valve for the working element; and the jack-up selector valve has a first select position where, when a pressure in the bottom chamber of the hydraulic cylinder is higher than the predetermined pressure, the second directional control valve for the working element and the third directional control valve for the working element are held in neutral positions, respectively, to hold permissible switching of the first directional control valve for the working element by a manipulation of the control device, and a second select position where, when a pressure in the bottom chamber of the hydraulic cylinder is not higher than the predetermined pressure, the feeding of pressure oil, which is to be delivered from the second hydraulic pump and third hydraulic pump, to the rod chamber of the hydraulic cylinder is held permissible in association with the switching of the second directional control valve for the working element and the third directional control valve for the working element by a manipulation of the control device.

In the present invention constructed as described above, when the pressure in the bottom chamber of the hydraulic cylinder is higher than the predetermined pressure, for example, in a lowering operation of the working element, specifically during a lowering operation in the air, the jack-up selector valve is held in the first select position, and by switching the first directional control valve for the working element via the control device, the oil in the bottom chamber of the hydraulic cylinder is discharged, thereby making it possible to perform the lowering operation in the air. On the other hand, when the pressure in the bottom chamber of the hydraulic cylinder has become the predetermined pressure or lower as a result of a contact of the working element with the ground in the course of a lowering operation of the working element, the jack-up selector valve is switched to the second select position. At this time, the control device is manipulated to switch the second directional control valve for the working element and the third directional control valve for the working element, the pressure oil delivered from the second hydraulic pump is fed to the rod compartment of the hydraulic cylinder via the second directional control valve for the working element, and further, the pressure oil delivered from the third hydraulic pump is fed to the rod chamber of the hydraulic cylinder via the third directional control valve for the working element. By these pressure oil fed to the rod chamber of the hydraulic cylinder, it is possible to perform a jack-up operation that strongly pushes the working element against the ground.

As described above, when the pressure in the bottom chamber of the hydraulic cylinder has become the predetermined pressure or lower and the jack-up selector valve has been switched to the second select position, the present invention can perform a jack-up operation by feeding the pressure oil from the second hydraulic pump and third hydraulic pump to the rod chamber of the hydraulic cylinder by a switching control of the second directional control valve for the working element and the third directional control valve for the working element via the control device. A jack-up operation can, therefore, be realized by a switching control of the second directional control valve for the working element and the third directional control valve for the working element without arrangement of a flow rate control valve, which would otherwise be needed to enable feeding of pressure oil to the first to third directional control valves for the working element, and a center bypass selector valve, which would otherwise be arranged on a downstream side of center bypass passages of the first to third directional control valves for the working element.

The hydraulic drive system according to the present invention may also be characterized in that in the above-described invention, the hydraulic drive system is further provided with a right travel motor and left travel motor for driving corresponding ones of a pair of crawler tracks, a directional control valve for the right travel motor to control a flow of pressure oil to be fed to the right travel motor, and a directional control valve for the left travel motor to control a flow of pressure oil to be fed to the left travel motor, and the second directional control valve for the working element and one of the directional control valve for the right travel motor and the directional control valve for the left travel motor are connected, in parallel with each other, to the second hydraulic pump.

In the present invention constructed as described above, upon a combined operation of traveling and jack-up, pressure oil is fed to the directional control valve for the right travel motor, for example, from the first hydraulic pump by switching the directional control valve for the right travel motor and the directional control valve for the left travel motor, whereby a traveling operation is performed. At this time, the second directional control valve for the working element and the third directional control valve for the working element are switched by a control via the control device, and therefore, the hydraulic drive system is brought into a state that the pressure oil from the second hydraulic pump can be also fed, for example, to the second directional control valve for the working element, said second directional control valve being connected, in parallel with the directional control valve for the right travel motor, to the second hydraulic pump. Depending on the level of a load pressure, however, the pressure oil from the second hydraulic pump is fed, for example, only to the directional control valve for the right travel motor. Accordingly, the pressure oil from the third hydraulic pump is fed to the rod chamber of the hydraulic cylinder via the third directional control valve for the working element, whereby a jack-up operation is performed. In this manner, a smooth combined operation of traveling and jack-up can be performed.

The hydraulic drive system according to the present invention may also be characterized in that in the above-described invention, the first directional control valve for the working element has a regenerative circuit capable of feeding pressure oil, which is discharged from the bottom chamber of the hydraulic cylinder, to the rod chamber of the hydraulic cylinder.

In the present invention constructed as described above, when the pressure in the bottom chamber of the hydraulic cylinder becomes higher than the predetermined pressure in the course of a lowering operation of the working element in the air, the pressure oil discharged from the bottom chamber of the hydraulic cylinder is regenerated in the rod chamber of the hydraulic cylinder via the regenerative circuit of the first directional control valve for the working element, thereby making it possible to smoothly perform the lowering operation of the working element in the air. As the pressure oil discharged from the bottom chamber of the hydraulic cylinder is fed to the rod chamber via the regenerative circuit, it is unnecessary to feed the pressure oil, which is delivered from the first hydraulic pump, to the hydraulic cylinder in the lowering operation of the working element in the air. The pressure oil delivered from the first hydraulic pump can, therefore, be fed to another actuator so that a combined operation can be performed well.

The hydraulic drive system according to the present invention may also be characterized in that in the above-described invention, the hydraulic working machine comprises a hydraulic excavator, the working element comprises a boom, and the first directional control valve for the working element, the second directional control valve for the working element and the third directional control valve for the working element comprise a first directional control valve for the boom, a second directional control valve for the boom and a third directional control valve for the boom, respectively. The present invention constructed as described above can perform a jack-up operation by a lowering operation of the boom of the hydraulic excavator.

Advantageous Effects of the Invention

The hydraulic drive system according to the present invention for the hydraulic working machine is provided with the first hydraulic pump and second hydraulic pump, the first directional control valve for the working element, said first directional control valve being for controlling a flow of pressure oil delivered from the first hydraulic pump and to be fed to the hydraulic cylinder, the second directional control valve for the working element, said second directional control valve being for controlling a flow of pressure oil delivered from the second hydraulic pump and to be fed to the hydraulic cylinder. The hydraulic drive system is also provided with the third directional control valve for the working element to control a flow of pressure oil to be fed to the bottom chamber or rod chamber of the hydraulic cylinder, said third directional control valve for the working element being switchable by a manipulation of a control device, and also with the third hydraulic pump for feeding pressure oil to the third directional control valve for the working element. The jack-up selector valve has the second select position where, when the pressure in the bottom chamber of the hydraulic cylinder is not higher than the predetermined pressure, the feeding of pressure oil, which is delivered from the second hydraulic pump and third hydraulic pump, to the rod chamber of the hydraulic cylinder is held permissible in association with switching of the second directional control valve for the working element and the third directional control valve for the working element by a manipulation of the control device. Without arrangement of a flow rate control valve, which would otherwise be needed to enable feeding of pressure oil to the directional control valves for the working element, and a center bypass selector valve, it is, therefore, possible to realize a jack-up operation by manipulating, with the jack-up selector valve being held in the second select position, the control device to switch the second directional control valve for the working element and the third directional control valve for the working element such that the pressure oil is fed from the second hydraulic pump and third hydraulic pump to the rod chamber of the hydraulic cylinder. Excellent control performance can, therefore, be assured for the jack-up operation without a potential problem that in the jack-up operation, an inconvenience may arise in the timing interval between the switching time of a flow control valve and that of a center bypass selector valve when the flow control valve and center bypass selector valve are arranged as in the conventional technology. As a consequence, it is possible to inhibit a shock on the hydraulic working machine upon a jack-up operation although the occurrence of such a shock has heretofore been a potential problem. In addition, it is also possible to eliminate an odd feel which may be given to an operator due to a response delay upon a jack-up operation.

MODES FOR CARRYING OUT THE INVENTION

The embodiment of the present invention will hereinafter be described based on the drawings.

[One Example of Hydraulic Working Machine in which this Embodiment can be Arranged]

Figure 1:
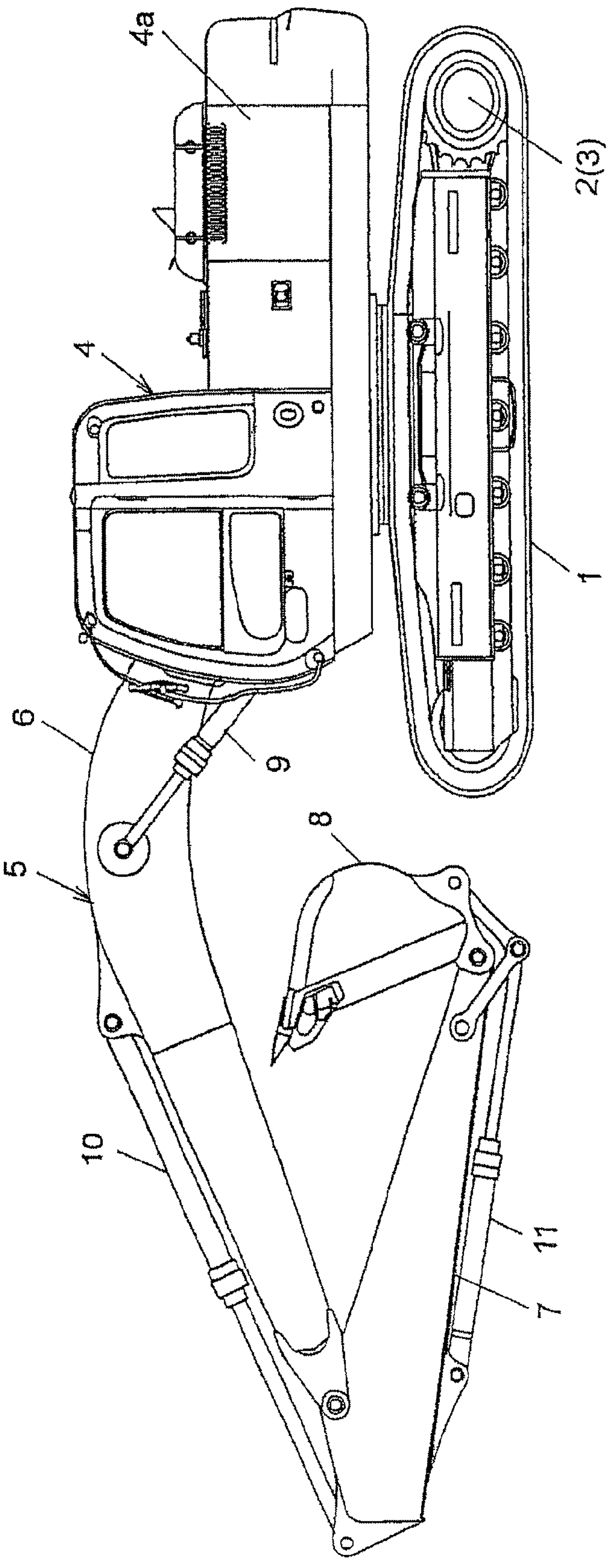
FIG. 1 is a side view showing a hydraulic excavator taken as an example of a hydraulic working machine, in which the hydraulic drive system according to one embodiment of the present invention can be arranged.

FIG. 1 is a side view showing a hydraulic excavator taken as an example of a hydraulic working machine, in which the hydraulic drive system according to this embodiment can be arranged.

As shown in FIG. 1, the hydraulic excavator in which the hydraulic drive system according to this embodiment can be arranged is provided with a travel base 1 having a pair of crawl tracks drivable by a right travel motor 2 and left travel motor 3, a revolving upperstructure 4 mounted on the travel base 1 and having an engine compartment 4*a*, etc., and a front working mechanism 5 attached to the revolving upperstructure 4. The front working mechanism 5 includes a boom 6 attached pivotally in an up-and-down direction to the revolving upperstructure 4, an arm 7 attached pivotally in an up-and-down direction to a free end of the boom 6, and a bucket 8 attached pivotally in an up-and-down direction to a free end of the boom 7. In addition, the front working mechanism 5 also includes boom cylinders 9 for driving the boom 6, an arm cylinder 10 for driving the arm 7, and a bucket cylinder 11 for driving the bucket 8. The above-mentioned boom 6, arm 7 and bucket 8 constitute working elements, respectively, which are movable up and down. On the other hand, the above-mentioned boom cylinders 9, arm cylinder 10 and bucket cylinder 11 constitute double-acting hydraulic cylinders, respectively, which drive the corresponding working elements.

[Construction of the Hydraulic Drive System According to this Embodiment]

Figure 2:
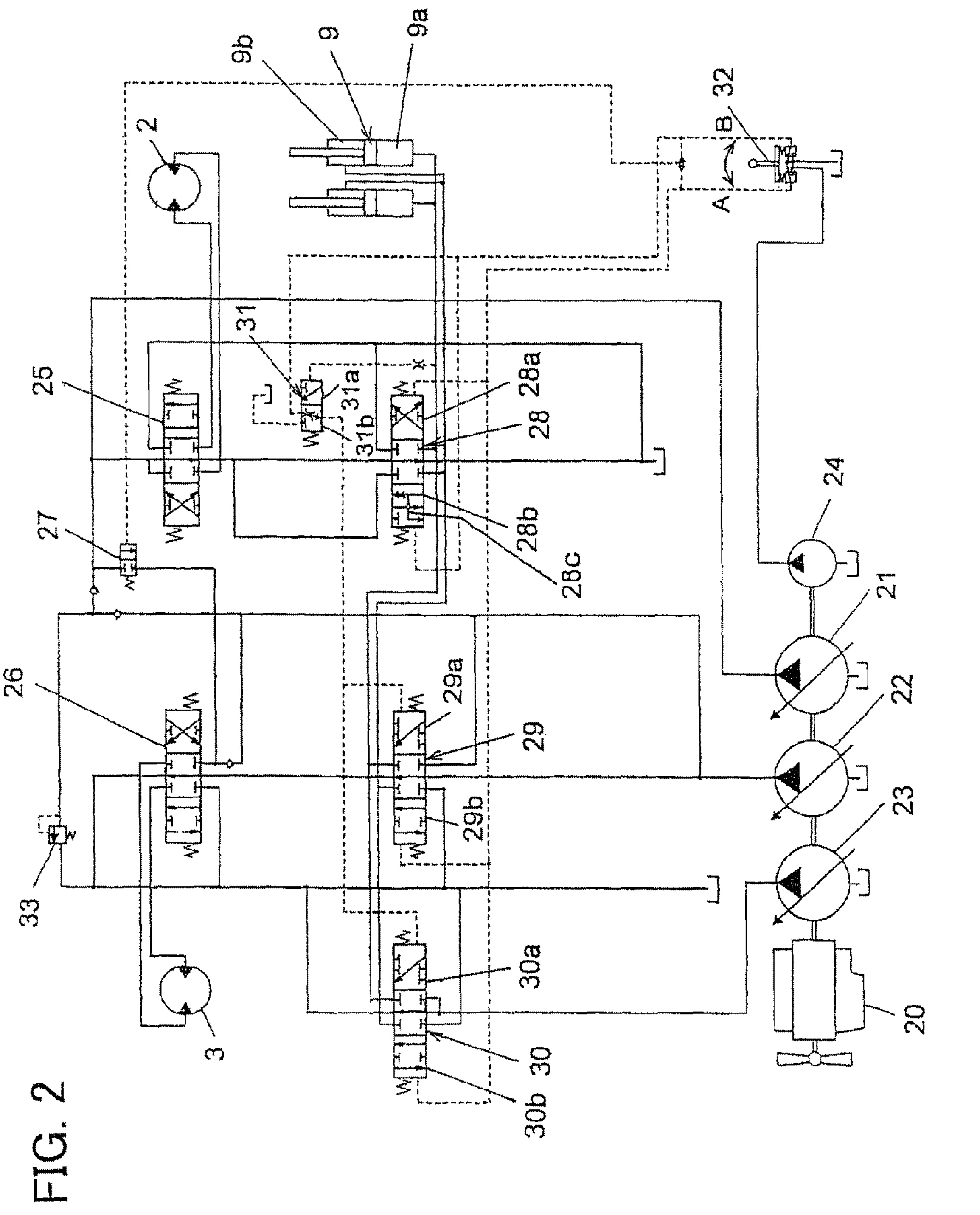
FIG. 2 is a hydraulic circuit diagram illustrating the construction of the hydraulic drive system of the embodiment.

FIG. 2 is a hydraulic circuit diagram illustrating the construction of the hydraulic drive system according to this embodiment.

The hydraulic drive system according to this embodiment is provided with an engine 20 arranged in the engine compartment 4*a* of the above-mentioned revolving upperstructure 4, and a first hydraulic pump 21, second hydraulic pump 22, third hydraulic pump 23 and pilot pump 24, all of which are drivable by the engine 20. The hydraulic drive system according to this embodiment is also provided with a first directional control valve for a working element, specifically a first directional control valve 28 for the boom, a second directional control valve for the working element, specifically a second directional control valve 29 for the boom, and a third directional control valve for the working element, specifically a third directional control valve 30 for the boom. The first directional control valve 28 for the boom controls a flow of pressure oil to be fed from the first hydraulic pump 21 to bottom chambers 9*a* or rod chambers 9*b* of the above-mentioned boom cylinders 9. The second directional control valve 29 for the boom controls a flow of pressure oil to be fed from the second hydraulic pump 22 to the bottom chambers 9*a* or rod chambers 9*b* of the boom cylinders 9. The third directional control valve 30 for the boom controls a flow of pressure oil to be fed from the third hydraulic pump 23 to the bottom chambers 9*a* or rod chambers 9*b* of the boom cylinders 9. Further, the hydraulic drive system according to this embodiment is also provided with a control device 32 for switchingly controlling these first directional control valve 28 for the boom, second directional control valve 29 for the boom, and third directional control valve 30 for the boom.

Also provided is a jack-up selector valve 31, which is switched when a pressure in a hydraulic cylinder, specifically in the bottom chambers 9*a* of the boom cylinders 9 has reached a predetermined pressure. This jack-up selector valve 31 has a first select position 31*a* where, when the pressure in the bottom chambers 9*a* of the boom cylinders 9 is higher than the predetermined pressure, a control chamber on the side of a right position 29*a* of the second directional control valve 29 for the boom is brought into communication with a reservoir, a control chamber on the side of a right position 30*a* of the third directional control valve 30 for the boom is brought into communication with the reservoir, these second directional control valve 29 for the boom and third directional control valve 30 for the boom are held in neutral positions, respectively, and switching of the first directional control valve 28 for the boom by a manipulation of the control device 32 is held permissible. This jack-up selector valve 32 also has a second select position 31*b* where, when the pressure in the bottom chambers 9*a* of the boom cylinders 9 is not higher than the predetermined pressure, the feeding of pressure oil, which is delivered from the second hydraulic pump 22 and third hydraulic pump 23, to the rod chambers 9*b* of the boom cylinders 9 is held permissible in association with switching of the second directional control valve 29 for the boom and the third directional control valve 30 for the boom by a manipulation of the control device 32.

A second switch position 28*b* of the first directional control valve 28 for the boom has a regenerative circuit 28*c* capable of feeding pressure oil, which is discharged from the bottom chambers 9*a* of the boom cylinders 9, to the rod chambers 9*b* of the boom cylinders 9. This second select position 28*b* also has a center bypass passage through which pressure oil delivered from the first hydraulic pump 31 is released into the reservoir.

This embodiment is also provided with a directional control valve 25 for the right travel motor and a directional control valve 26 for the left travel motor. The directional control valve 25 for the right travel motor controls a flow of pressure oil to be fed to the right travel motor 2 arranged on the above-mentioned travel base 1, while the directional control valve 26 for the left travel motor controls a flow of pressure oil to be fed to the left travel motor 3 arranged on the above-mentioned travel base 1. The second directional control valve 29 for the boom and one of the directional control valve 25 for the right travel motor and the directional control valve 26 for the left travel motor, for example, the directional control valve 26 for the left travel motor are connected, in parallel with each other, to the second hydraulic pump 22.

Also provided are a flow combiner valve 27 and a main relief valve 33. The flow combiner valve 27 can bring an upstream side of the directional control valve 25 for the right travel motor into communication with an upstream side of the directional control valve 26 for the left travel motor. The main relief valve 33 specifies a maximum delivery pressure for the first hydraulic pump 21, second hydraulic pump 22 and third hydraulic pump 23. The remaining circuit construction is omitted for the sake of simplification of the description.

This embodiment constructed as described above can perform various operations as will be described hereinafter.

[Single Operation of Boom Raising]

When the control device 32 is manipulated in the direction of arrow A in FIG. 2, pilot pressure oil delivered from the pilot pump 24 is applied to a control chamber on the side of a right position 28*a* of the first directional control valve 28 for the boom, a control chamber on the side of a left position 29*b* of the second directional control valve 29 for the boom, and a control chamber on the side of a left position 30*b* of the third directional control valve 30 for the boom. As a result, the first directional control valve 28 for the boom is switched to the right position 28*a*, and pressure oil from the first hydraulic pump 21 is fed to the bottom chambers 9*a* of the boom cylinders 9 via the directional control valve 25 for the right travel motor and the first directional control valve 28 for the boom. Further, the second directional control valve 29 for the boom is switched to the left position 29*b*, and pressure oil from the second hydraulic pump 22 is fed to the bottom chambers 9*a* of the boom cylinders 9 via the second directional control valve 29 for the boom. Furthermore, the third directional control valve 30 for the boom is also switched to the left position 30*b*, and pressure oil from the third hydraulic pump 23 is fed to the bottom chambers 9*a* of the boom cylinders 9 via the third directional control valve 30 for the boom.

The oil in the rod chambers 9*a* of the boom cylinders 9 is returned to the reservoir via the right position 28*a* of the first directional control valve 28 for the boom, the left position 29*b* of the second directional control valve 29 for the boom and the left position 30*b* of the third directional control valve 30 for the boom. As described above, the combined pressure oil from the first hydraulic pump 21, second hydraulic pump 22 and third hydraulic pump 23 is fed to the bottom chambers 9*a* of the boom cylinders 9 so that the boom cylinders 9 extend to perform a single raising operation of the boom 6 shown in FIG. 1.

[Single Operation of Boom Lowering in the Air]

When the control device 32 is manipulated in the direction of arrow B in FIG. 2, the pilot pressure oil is applied to a control chamber on the side of a left position 28*b* of the first directional control valve 28 for the boom, and the first directional control valve 28 for the boom is switched to the left position 28*b*. As a result, the bottom chambers 9*a* of the boom cylinders 9 are brought into communication with the reservoir, and at the same time, a portion of the return oil from the bottom chambers 9*a* is fed to the rod chambers 9*b* of the boom cylinders 9 via the regenerative circuit 28*c*, which is included in the left position 28*b* of the first directional control valve 28 for the boom, to perform regeneration. Consequently, the boom cylinders 9 contract so that a single operation of boom lowering is performed under the own weight of the front working mechanism 5 including the boom 6.

At this time, the pressure in the bottom chambers 9*a* of the boom cylinders 9 is held at a pressure higher than the predetermined pressure, specifically at a pressure higher than the switching pressure for the jack-up selector valve 31, and the jack-up selector valve 31 is switched to the first select position 31*a*. As a result, the control chamber on the side of the right position 29*a* of the second directional control valve 29 for the boom is also brought into communication with the reservoir like the control chamber on the side of the left position 29*b*, and similarly, the control chamber on the side of the right position 30*a* of the third directional control valve 30 for the boom is also brought into communication with the reservoir like the control chamber on the side of the left position 30*b*. Therefore, these second directional control valve 29 for the boom and third directional control valve 30 for the boom are held in the neutral positions, respectively. In this state, the pressure oil from the first hydraulic pump 21 is returned to the reservoir via the directional control valve 25 for the right travel motor and the center bypass passage included in the left position 28*b* of the first directional control valve 28 for the boom. The pressure oil from the second hydraulic pump 22 is returned to the reservoir via the second directional control valve 29 for the boom and the directional control valve 26 for the left travel motor. The pressure oil from the third hydraulic pump 23 is returned to the reservoir via the third directional control valve 30 for the boom. Therefore, the pressure oil delivered from the first hydraulic pump 21, second hydraulic pump 22 and third hydraulic pump 23 is not fed to the rod chambers 9*b* of the boom cylinders 9.

[Single Operation of Jack-Up]

When a single operation of jack-up that lifts up a body is performed by manipulating the control device 32 in the direction of arrow B in FIG. 2 with the bucket 8 or the like of the front working mechanism 5 being pushed against the ground, the pressure in the bottom chambers 9*a* of the boom cylinders 9 drops to the predetermined pressure or lower. As a consequence, the jack-up selector valve 31 is switched to the second select position 31*b* under its spring force.

Accordingly, by the above-mentioned manipulation of the control device 32, the first directional control valve for the boom is switched to the left position 28*b*, and by the pilot pressure fed via the jack-up selector valve 31, the second directional control valve 29 for the boom is switched to the right position 29*a* and the third directional control valve 30 for the boom is also switched to the right position 30*a*. In the state that the first directional control valve 28 for the boom has been switched to the left position 28*b*, the pressure oil from the first hydraulic pump 21 is returned to the reservoir via the center bypass passage in the left position 28*b*. This pressure oil from the first hydraulic pump 21 is, therefore, not fed to the boom cylinders 9.

The pressure oil from the second hydraulic pump 22 is fed to the rod chambers 9*b* of the boom cylinders 9 via the right position 29*a* of the second directional control valve 29 for the boom. Similarly, the pressure oil from the third hydraulic pump 23 is fed to the rod chambers 9*b* of the boom cylinders 9 via the right position 30*a* of the third directional control valve 30 for the boom. By the pressure oil from these second hydraulic pump 22 and third hydraulic pump 23, the boom cylinders contract to drive the boom cylinder 6 in a lowering direction, whereby pushing force is produced against the ground to perform the single operation of jack-up.

[Single Operation of Traveling]

When an unillustrated travel control device is manipulated to switch the directional control valve 25 for the right travel motor and the directional control valve 26 for the left travel motor, the pressure oil from the first hydraulic pump 21 and that from the second hydraulic pump 22 are fed to the right travel motor 2 and left travel motor 3 via the directional control valve 25 for the right travel motor and the directional control valve 26 for the left travel motor, respectively. The right travel motor 2 and left travel motor 3 are, therefore, actuated to drive the pair of crawler tracks, so that traveling is performed.

[Combined Operation of Traveling and Boom Raising]

When the control device 32 is manipulated in the direction of arrow A in FIG. 2 along with a manipulation of the unillustrated travel control device, the pressure oil from the first hydraulic pump 21 and that from the second hydraulic pump 22 are fed to the right travel motor 2 and left travel motor 3 via the directional control valve 25 for the right travel motor and the directional control valve 26 for the left travel motor, respectively. Traveling is, therefore, performed by the pressure oil from the first hydraulic pump 21 and that from the second hydraulic pump 22. The pressure oil from the third hydraulic pump 23 is fed to the bottom chambers 9*a* of the boom cylinders 9 via the left position 30*b* of the third directional control valve 30 for the boom. Boom raising is, therefore, performed by the pressure oil from the third hydraulic pump 23.

[Combined Operation of Traveling and Boom Raising in the Air]

When the control device 32 is manipulated in the direction of arrow A in FIG. 2 along with a manipulation of the unillustrated travel control device, the pressure oil from the first hydraulic pump 21 and that from the second hydraulic pump 22 are fed to the right travel motor 2 and left travel motor 3, respectively, to perform traveling. In addition, the pressure oil in the boom cylinders 9*a* is regenerated in the rod chambers 9*b* via the regenerative circuit 28*c* included in the second switch position 28*b* of the first directional control valve 28 for the boom, whereby a boom lowering operation is performed under the own weight of the front working mechanism 5.

[Combined Operation of Traveling and Jack-Up]

When the control device 32 is manipulated in the direction of arrow A in FIG. 2 along with a manipulation of the unillustrated travel control device, the pressure oil from the first hydraulic pump 21 and that from the second hydraulic pump 22 are fed to the right travel motor 2 and left travel motor 3, respectively, to perform traveling. In addition, the pressure oil from the third hydraulic pump 23 is fed to the rod chambers 9*b* of the boom cylinders 9 via the left position 30*b* of the third directional control valve 30 for the boom. A jack-up operation is, therefore, performed by the pressure oil from the third hydraulic pump 23.

[Advantageous Effects of the Embodiment]

According to this embodiment constructed as described above, when the pressure in the bottom chambers 9*a* of the boom cylinders 9 drops to the predetermined pressure or lower in the course of a single operation of jack-up, the jack-up selector valve 31 is switched to the second select position 31*b*, and by a switching control of the second directional control valve 29 for the boom and the third directional control valve 30 for the boom by the control device 32, the pressure oil from the second hydraulic pump 22 and third hydraulic pump 23 is fed to the rod chambers 9*b* of the boom cylinders 9, whereby the single operation of jack-up can be performed. Upon performing a combined operation of traveling and jack-up, the pressure oil from the first hydraulic pump 21 and that from the second hydraulic pump 22 are fed to the right travel motor 2 and left travel motor 3, respectively, so that a traveling operation can be performed, and in addition, the pressure oil from the third hydraulic pump 23 is fed to the rod chambers 9*b* of the boom cylinders 9 so that a jack-up operation can be performed. A jack-up operation can, therefore, be realized by a switching control of the second directional control valve 29 for the boom and the third directional control valve 30 for the boom without arrangement of such a flow rate control valve and center bypass selector valve as described in Patent Document 1. It is, hence, possible to avoid a potential problem that in the jack-up operation, an inconvenience would otherwise arise in the timing interval between the switching time of a flow control valve and that of a center bypass selector valve when the flow control valve and center bypass selector valve are arranged. As a consequence, it is possible to inhibit a shock on the hydraulic excavator upon a jack-up operation. In addition, it is also possible to eliminate an odd feel which may be given to an operator due to a response delay upon a jack-up operation.

When a combined operation of traveling and jack-up is performed as mentioned above, the jack-up operation can be performed by feeding pressure oil from the third hydraulic pump 23 to the rod chambers 9*b* of the boom cylinders 9 via the third directional control valve 30 for the boom. The combined operation of traveling and jack-up can, therefore, be smoothly performed.

Upon a lowering operation of the boom 6 in the air, the pressure oil discharged from the bottom chambers 9*a* of the boom cylinders 9 is fed to the rod chambers 9*b* of the boom cylinders 9 via the regenerative circuit 28*c* included in the left position 28*b* of the first directional control valve 28 for the boom, and is regenerated there. As a consequence, the lowering operation of the boom 6 can be smoothly performed in the air.

LEGEND

1 Travel base
2 Right travel motor
3 Left travel motor
4 Revolving upperstructure
5 Front working mechanism
6 Boom (Working element)
9 Boom cylinder (Hydraulic cylinder)
9*a* Bottom chamber
9*b* Rod chamber
21 First hydraulic pump
22 Second hydraulic pump
23 Third hydraulic pump
24 Pilot pump
25 Directional control valve for right travel motor
26 Directional control valve for left travel motor
28 First directional control valve for the boom (first directional control valve for the working element)
28*a* Right position
28*b* Left position
28*c* Regenerative circuit
29 Second directional control valve for the boom (second directional control valve for the working element)
29*a* Right position
29*b* Left position
30 Third directional control valve for the boom (third directional control valve for the working element)
30*a* Right position
30*b* Left position
31 Jack-up selector valve
31*a* First select position
31*b* Second select position
32 Control device

The invention claimed is:

1. A hydraulic drive system for a hydraulic working machine, said hydraulic drive system being provided with a first hydraulic pump and second hydraulic pump for delivering pressure oil to drive a working element which is movable up and down, a double-acting hydraulic cylinder operable by pressure oil, which has been delivered from the first hydraulic pump and second hydraulic pump, to drive the working element, a first directional control valve for the working element, said first directional control valve being for controlling a flow of pressure oil to be fed from the first hydraulic pump to a bottom chamber or rod chamber of the hydraulic cylinder, a second directional control valve for the working element, said second directional control valve being for controlling a flow of pressure oil to be fed from the second hydraulic pump to the bottom chamber or rod chamber of the hydraulic cylinder, a control device for switchingly controlling the first directional control valve for the working element and the second directional control valve for the working element, and a jack-up selector valve to be switched when a pressure in the bottom chamber of the hydraulic cylinder has reached a predetermined pressure, wherein:

the hydraulic drive system is further provided with a third directional control valve for the working element to control a flow of pressure oil to be fed to the bottom chamber or rod chamber of the hydraulic cylinder, said third directional control valve for the working element being switchable by a manipulation of the control device, and also with a third hydraulic pump for feeding pressure oil to the third directional control valve for the working element; and the jack-up selector valve has:

a first select position where, when a pressure in the bottom chamber of the hydraulic cylinder is higher than the predetermined pressure, the second directional control valve for the working element and the third directional control valve for the working element are held in neutral positions, respectively, to hold permissible the switching of the first directional control valve for the working element by a manipulation of the control device, and a second select position where, when a pressure in the bottom chamber of the hydraulic cylinder is not higher than the predetermined pressure, the feeding of pressure oil, which is to be delivered from the second hydraulic pump and third hydraulic pump, to the rod chamber of the hydraulic cylinder is held permissible in association with the switching of the second directional control valve for the working element and the third directional control valve for the working element by a manipulation of the control device.

2. The hydraulic drive system according to claim 1, wherein:

the hydraulic drive system is further provided with a right travel motor and left travel motor for driving corresponding ones of a pair of crawler tracks, a directional control valve for the right travel motor to control a flow of pressure oil to be fed to the right travel motor, and a directional control valve for the left travel motor to control a flow of pressure oil to be fed to the left travel motor, and the second directional control valve for the working element and one of the directional control valve for the right travel motor and the directional control valve for the left travel motor are connected, in parallel with each other, to the second hydraulic pump.

3. The hydraulic drive system according to claim 1, wherein:

the first directional control valve for the working element has a regenerative circuit capable of feeding pressure oil, which is discharged from the bottom chamber of the hydraulic cylinder, to the rod chamber of the hydraulic cylinder.

4. The hydraulic drive system according to claim 1, wherein:

the hydraulic working machine comprises a hydraulic excavator, the working element comprises a boom, the hydraulic cylinder comprises a boom cylinder, and the first directional control valve for the working element, the second directional control valve for the working element and the third directional control valve for the working element comprise a first directional control valve for the boom, a second directional control valve for the boom and a third directional control valve for the boom, respectively.

5. The hydraulic drive system according to claim 2, wherein:

the hydraulic working machine comprises a hydraulic excavator, the working element comprises a boom, the hydraulic cylinder comprises a boom cylinder, and the first directional control valve for the working element, the second directional control valve for the working element and the third directional control valve for the working element comprise a first directional control valve for the boom, a second directional control valve for the boom and a third directional control valve for the boom, respectively.

6. The hydraulic drive system according to claim 3, wherein:

the hydraulic working machine comprises a hydraulic excavator, the working element comprises a boom, the hydraulic cylinder comprises a boom cylinder, and the first directional control valve for the working element, the second directional control valve for the working element and the third directional control valve for the working element comprise a first directional control valve for the boom, a second directional control valve for the boom and a third directional control valve for the boom, respectively.

* * * * *